United States Patent [19]
Juergens et al.

[11] Patent Number: 5,690,347
[45] Date of Patent: Nov. 25, 1997

[54] TRACTOR TRAILER INTEGRATED JACKKNIFE CONTROL DEVICE

[75] Inventors: Eugene H. Juergens; Timothy A. Novesky; Jerome Rychtik, all of Grafton, Wis.

[73] Assignee: Tractor Trailer Safety Systems, Inc., Appleton, Wis.

[21] Appl. No.: 632,220

[22] Filed: Apr. 15, 1996

[51] Int. Cl.⁶ ................................................. B60T 7/12
[52] U.S. Cl. ........................... 280/432; 280/DIG. 14
[58] Field of Search ........................ 303/7, 20, 123; 188/112 A, 125, 126, 142, 175, 329, 330; 280/432, DIG. 14

[56] References Cited

U.S. PATENT DOCUMENTS

| | | | |
|---|---|---|---|
| 2,470,383 | 5/1949 | Wakeman | 280/33.05 |
| 2,709,088 | 6/1955 | Orbits | 280/432 |
| 3,250,547 | 5/1966 | Myers | 280/432 |
| 3,507,517 | 4/1970 | Eagle | 280/432 |
| 3,722,919 | 3/1973 | Herbert | 280/432 |
| 3,989,268 | 11/1976 | Rawn | 280/432 |
| 4,067,592 | 1/1978 | Horton | 280/432 |
| 4,120,514 | 10/1978 | Sanders | 280/432 |
| 4,241,934 | 12/1980 | Buehner | 280/432 |
| 4,323,264 | 4/1982 | Paielli | 280/405 |
| 4,346,910 | 8/1982 | Beck | 280/432 |
| 4,402,522 | 9/1983 | Ratsko et al. | 280/432 |
| 4,494,765 | 1/1985 | Ratsko et al. | 280/432 |
| 4,744,581 | 5/1988 | Cables | 280/432 |
| 4,993,738 | 2/1991 | Bennett | 280/432 |
| 5,188,434 | 2/1993 | Ruf et al. | 303/146 |
| 5,411,322 | 5/1995 | Breen | 303/7 |
| 5,564,533 | 10/1996 | Parsons | 188/250 G X |

OTHER PUBLICATIONS

Making a Comeback In The Big Rigs, Popular Science, Jul. 1993, Chuck Murray p. 38.

*Primary Examiner*—Robert J. Oberleitner
*Assistant Examiner*—Pamela J. Lipka
*Attorney, Agent, or Firm*—Nilles & Nilles

[57] ABSTRACT

An integrated jackknife control device for a tractor trailer assembly requires minimal if any modification to the existing fifth wheel coupler of the tractor trailer. The device comprises a computer controlled braking system including one or more pivot brakes acting directly on the trailer body, sensors which detect tractor trailer conditions indicative of incipient or full-fledged jackknifing and possibly other hazardous conditions such as collision or panic braking, and a proportional controller which causes one or more brake to apply a resistive force directly to the trailer which increases proportionally with a sensed degree of trailer jackknifing. The braking system preferably will automatically remain in a standby mode during backing maneuvers and will allow the operator to actuate the braking system manually and also to reset or return the braking system to a standby condition.

19 Claims, 15 Drawing Sheets

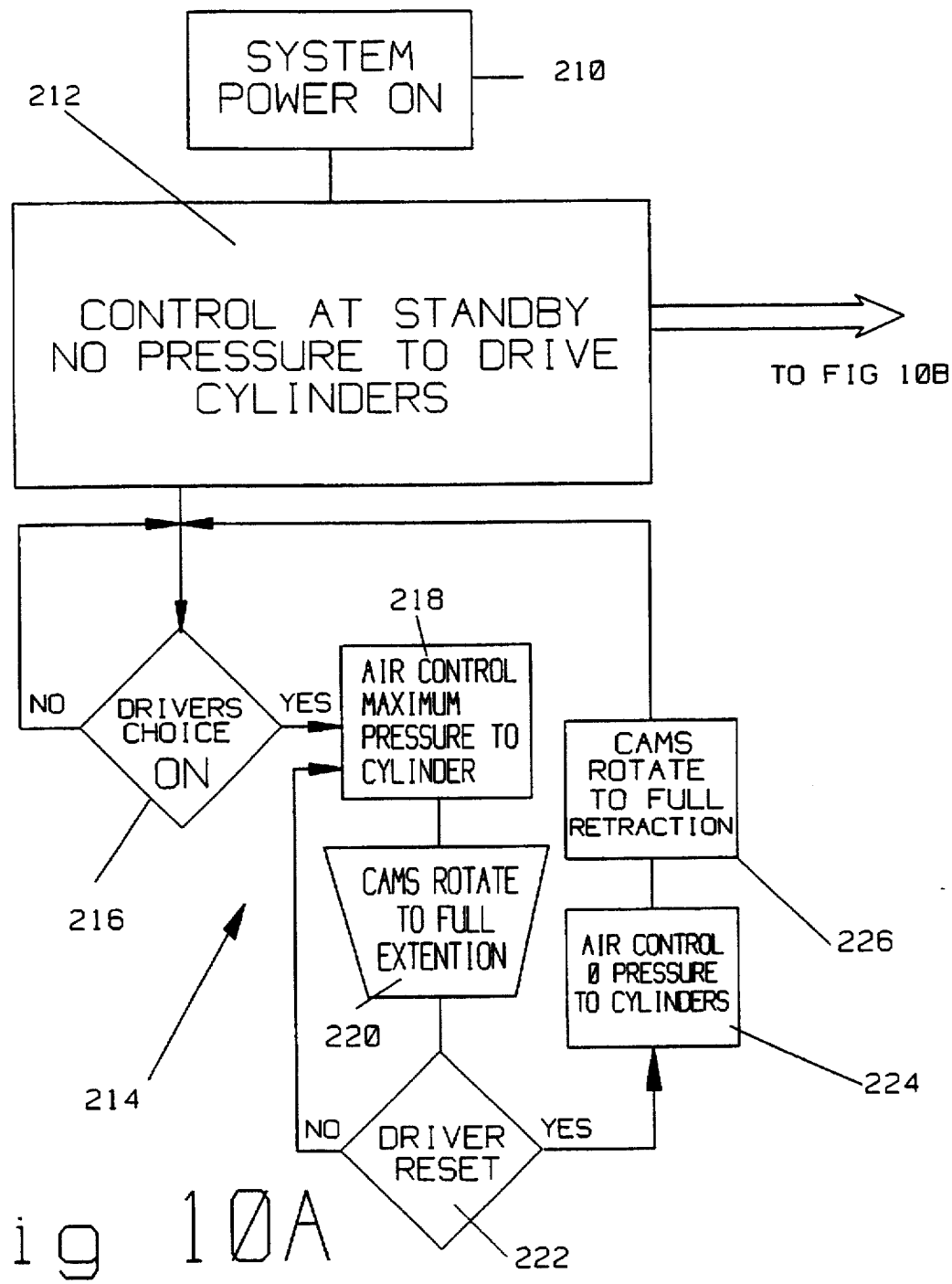

TRACTOR TRAILER INTEGRATED JACKKNIFE CONTROL DEVICE

BACKGROUND OF THE INVENTION

1. Field of the Invention

The invention relates to tractor trailer safety systems and, more particularly, to an integrated computer-controlled device which automatically senses an incipient trailer jackknife and aborts the jackknife before it becomes unmanageable

2. Discussion of the Related Art

Tractor trailer assemblies having a fifth wheel coupler connecting the trailer of the assembly to the tractor of the assembly are well known. The trailer is articulated to the tractor by a king pin extending from a first plate on the trailer to a second plate on the tractor so as to permit the trailer to rotate or swing horizontally about the king pin, thereby permitting the trailer to extend at an angle with respect to the line of tractor travel when the assembly traverses curves or turns.

A major problem with such tractor trailer assemblies is that, during hard braking, hard turning, and other similar conditions in which the trailer tends to overrun the tractor or in which trailer swinging becomes unmanageable, the trailer may jackknife or swing uncontrollably off the line of tractor travel. Trailer jackknifing can lead to a loss of control of the entire assembly and even to an assembly rollover.

Many systems have been proposed to prevent or at least to inhibit trailer jackknifing. The assembly most commonly used today is a system of anti-lock or ABS brakes acting on the wheels of the trailer and/or the tractor. The typical ABS system attempts to prevent axle lockup and otherwise to prevent excessive trailer overrunning and consequent jackknifing. ABS systems are rather complicated and difficult and expensive to install, particularly in a retrofit operation, because they must be bodily incorporated into the truck's braking system. Moreover, many drivers are leery of ABS systems because they inevitably take a degree of braking control away from the driver. ABS systems also necessarily act between the wheels and the road rather than directly on the trailer and therefore have only a secondary effect on trailer jackknifing.

Many systems have been proposed which attempt to prevent or inhibit trailer jackknifing by acting directly on the fifth wheel or elsewhere on the trailer body to prevent or at least inhibit excessive trailer swinging. However, all such systems exhibited marked drawbacks and disadvantages and never gained widespread commercial acceptance.

The most common type of directly-acting jackknife control safety device employs a limiting pin or other non-friction device acting directly on the fifth wheel assembly. Typical of such devices is that disclosed in U.S. Pat. No. 4,120,514 to Sanders (the Sanders patent). The safety device disclosed in the Sanders patent comprises (1) a fluid cylinder mounted on the fifth wheel coupler and (2) a projectable pin extending upwardly from the fluid cylinder and towards an arcuate slot in a plate mounted on the lower surface of the trailer. The fluid cylinder is manually controlled such that, when the driver believes that jackknifing is imminent, he or she actuates a switch which causes the pin to extend into the arcuate slot thereby to limit rotational movement of the trailer to the arcuate length of the slot −30° in either direction in the disclosed embodiment.

The safety device disclosed in the Sanders patent is rather complicated to install because it must cooperate directly with the fifth wheel and because the fifth wheel must be modified substantially to accommodate the extendible pin. Moreover, it relies on the driver for actuation and, even when activated, still permits a very large swinging motion of the trailer relative to the tractor which can be very dangerous, particularly at high vehicle speeds.

Jackknife control devices employing non-locking resistance to trailer movement are disclosed, e.g., in U.S. Pat. No. 4,067,592 to Horton and U.S. Pat. No. 3,507,517 to Eagle.

The devise disclosed in the Horton patent employs an elastic pad to selectively resist trailer swinging. The pad is mounted on a vertically reciprocating piston located directly under the trailer-mounted upper plate of the fifth wheel coupler. When the driver determines that the trailer is jackknifing, he actuates a switch which causes the rod to extend so that the pad engages the upper plate of the fifth wheel coupler to resist additional trailer swinging.

The Eagle patent discloses a frictional member which cooperates with a curved rail depending generally vertically from the trailer portion of the fifth wheel coupler. The frictional member is mounted on a horizontally reciprocating piston which is actuated by the standard air service brake system of the vehicle so as to apply frictional resistance to trailer swinging whenever the vehicle's brakes are applied, the resistance imposed by the frictional members increases proportionally with the applied braking forces.

Both Horton and Eagle, like Sanders, require manual intervention to prevent or inhibit trailer jackknifing. Neither reacts automatically and proportionally to an incipient jackknife condition. In addition, both are relatively complex and cannot be easily incorporated into an existing tractor trailer assembly design or retrofitted onto existing tractor trailer assemblies because they must cooperate directly with the fifth wheel coupler. Indeed, Eagle's device requires modifications to all fifth wheel couplers, and Horton's device requires that an adapter plate be added to some fifth wheel couplers for cooperation with the pad.

OBJECTS AND SUMMARY OF THE INVENTION

It is therefore a first primary object of the invention to provide an integrated jackknife control device for a tractor trailer assembly in the form of a braking system which automatically responds to an incipient jackknife condition to apply a braking force to the trailer which is proportional to the degree of jackknifing.

A secondary object of the invention is to provide a jackknife control device which meets the first primary object of the invention, which is relatively simple and inexpensive to fabricate and to assemble, and which can be easily incorporated into existing tractor trailer assembly designs or retrofitted onto an existing tractor trailer assembly.

In accordance with a first aspect of the invention, these objects are achieved by providing a braking system which includes a source of pressurized fluid, a proportional control valve, a fluid pressure cylinder, and a friction brake. The valve has an inlet port connected to the source of pressurized fluid and has an outlet port. The valve is controllable to selectively pressurize fluid in the outlet port to a variable level ranging from 0% of a maximum pressure level to 100% of the maximum pressure level. The fluid pressure cylinder is fluidically coupled to the outlet of the valve. The friction brake is mechanically coupled to the fluid pressure cylinder and is dimensioned and configured to apply a resistive force to the trailer which increases proportionally to the fluid pressure in the outlet port of the valve.

Preferably, the fluid pressure cylinder includes an axially movable rod, and the brake is a pivot brake which comprises a stationary mounting bracket, a metal cylinder, and a support rod. The mounting bracket comprises a base and two opposed end legs extending upwardly from the base, each of the end legs having a hole formed therethrough. The metal cylinder has a central axis, opposed axial ends, and an outer radial periphery. A friction pad is mounted on at least a portion of the outer radial periphery of the cylinder, extends along substantially an entire axial length of the cylinder, and extends around at least 30% of the circumference of the cylinder. The friction pad has semi-circular grooves formed in an outer peripheral surface thereof. The support rod 1) extends eccentrically through the cylinder and out of the opposed axial ends thereof so as to be parallel with, but offset from, the central axis of the cylinder, 2) is rotatably journaled in the holes in the legs of the mounting bracket, and 3) is mechanically coupled to the fluid pressure cylinder by a crank having a first end attached to the support rod and a second end attached to the rod of the fluid pressure cylinder.

Preferably, the braking system further comprises a computer which transmits signals to the valve, a sensor assembly which is electronically coupled to the computer, which monitors a physical relationship between the trailer and the tractor, and which is capable of generating and transmitting to the computer a signal indicative of a degree of trailer jackknifing, and a feedback sensor which is electronically coupled to the computer and which is capable of generating and transmitting to the computer a signal indicative of a current operational state of the brake. The sensor assembly preferably comprises a tractor velocity sensor and at least one of 1) a sensor monitoring an angle of inclination of the trailer relative to the tractor, and 2) a sensor providing a signal indicative of an overrunning inertia of the trailer relative to the tractor.

In order to permit manual monitoring, override, and reset, a manual controller preferably is electronically coupled to the computer. The manual controller includes a reset switch which, when activated, causes the computer to reset the brake 1) from a braking condition 2) to a non-braking condition.

Another secondary object of the invention is to provide a jackknife control device which meets the first primary object of the invention which monitors the overrunning inertia (if any) of the trailer relative to the tractor and which calculates the maximum angle that the trailer can swing off the line of tractor travel at a prevailing tractor speed.

Another secondary object of the invention is to provide a jackknife control device which meets the first primary object of the invention and which prevents or at least inhibits the build-up of debris on the friction surface of the brake which could otherwise inhibit brake operation.

In accordance with another aspect of the invention, this object is achieved by providing the friction pad with grooves formed in a braking surface thereof to channel debris away from the pad.

A second primary object of the invention is to provide a tractor trailer assembly having an improved jackknife control device.

In accordance with another aspect of the invention, this object is achieved by providing a tractor, a trailer, a fifth wheel coupler, and a brake. The tractor includes a cab and a trailer support frame presenting an upper horizontal surface. The trailer has a lower horizontal surface. The fifth wheel coupler connects the trailer to the tractor and includes (1) a lower plate mounted on the upper surface of the support frame, the lower plate having a socket formed therein, (2) an upper plate mounted on the lower surface of the trailer, and (3) a king pin which is attached to the upper plate, which extends downwardly from the upper plate, and which is received in the socket in the lower plate. The braking system, which is mounted on the tractor, includes a brake which is mounted on the trailer support frame. The brake includes a friction pad which is movable from a first, inoperative position in which it is spaced from the lower horizontal surface of the trailer to a second, braking position in which it engages the lower horizontal surface of the trailer at a location away from the upper plate so as to resist trailer jackknifing.

A third primary object of the invention is to provide an improved method of preventing or at least inhibiting trailer jackknifing automatically upon detecting an incipient trailer jackknife condition.

In accordance with yet another aspect of the invention, this object is achieved by providing a method comprising first providing a tractor trailer assembly including a tractor, a trailer connected to the tractor by a fifth wheel coupler, and a brake mounted on the tractor. Subsequent steps include (1) monitoring a physical relationship between the trailer and the tractor and generating a first signal indicative of a degree of trailer jackknifing, (2) transmitting the first signal to a computer, (3) determining, via the computer, and in response to the first signal, a braking force which must be applied to the trailer to prevent the trailer from jackknifing, and (4) in response to the determining step, automatically transmitting an electronic signal from the computer to a brake actuator to cause the brake to apply a braking force to the trailer which is proportional to a determined degree of trailer jackknifing.

Preferably, the computer automatically causes the brake actuator to reset the brake to an unbraked condition after termination of trailer jackknifing unless the brake is fully applied during the transmitting step. If the brake is fully applied during the transmitting step, the computer causes the brake actuator to reset the brake only upon receipt of a manually-generated reset signal.

Preferably, the computer causes the brake actuator to apply the brake only if it is determined that the degree of trailer jackknifing is above a designated threshold, and further comprising manually adjusting the designated threshold.

Another secondary object of the invention is to provide a method which meets the third primary object of the invention and in which a panic braking or stop situation is automatically detected and maximum control of the braking system is effected in response to a sensed panic stop situation.

In accordance with yet another object of the invention, this object is achieved by sensing a panic braking condition and causing full brake application in the presence of a sensed panic braking condition.

Still another secondary object of the invention is to provide a method which meets the third primary object of the invention and which allows the driver to reset the jackknife control device to standby after automatic maximum control and to manually actuate the brakes.

Still another secondary object of the invention is to provide a method which meets the third primary object of the invention and which automatically places the jackknife control device in a standby mode during backing maneuvers.

These and other objects, features, and advantages of the present invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A preferred exemplary embodiment of the invention is illustrated in the accompanying drawings in which like reference numerals represent like parts throughout, and in which:

FIGS. 10A, 10B, 11A, and 11B are flow charts illustrating the operation of the computer of the jackknife control device of FIGS. 1-6.

DETAILED DESCRIPTION OF THE PREFERRED EMBODIMENT

1. Resume

Figure 1:
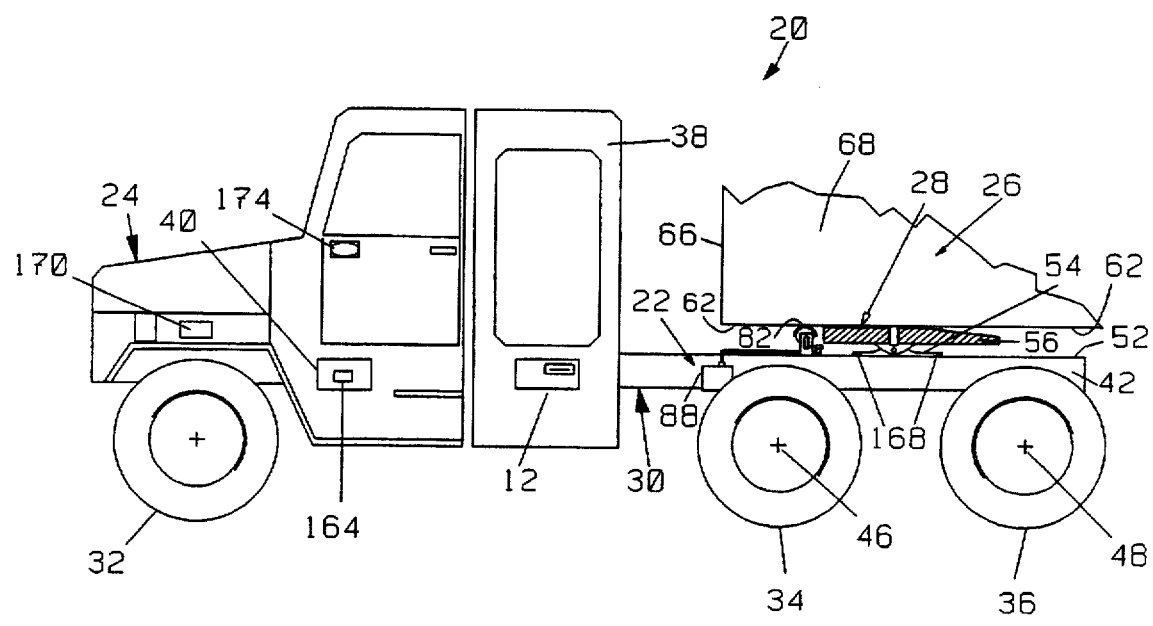
FIG. 1 is a fragmentary partially schematic side elevation view of a tractor trailer assembly and jackknife control device constructed in accordance with a preferred embodiment of the present invention.

Pursuant to the invention, an integrated jackknife control device is provided for a tractor trailer assembly which requires minimal if any modification to the existing fifth wheel coupler of the tractor trailer. The device comprises a computer controlled braking system including one or more pivot brakes acting directly on the trailer body, sensors which detect tractor trailer conditions indicative of incipient or full-fledged jackknifing and possibly other hazardous conditions such as collision or panic braking, and a proportional controller which causes one or more brakes to apply a resistive force directly to the trailer which increases proportionally with a sensed degree of trailer jackknifing. The braking system preferably will automatically remain in a standby mode during backing maneuvers and will allow the operator to actuate the braking system manually and also to reset or return the braking system to a standby condition.

2. System Overview

Referring initially to FIGS. 1-6, a tractor trailer assembly 20 is illustrated which employs a computer controlled braking system 22 forming the inventive jackknife control device. Tractor trailer assembly 20 comprises a tractor 24 and a trailer 26 coupled to one another by a conventional fifth wheel coupler 28.

The tractor 24 may comprise any conventional tractor capable of pulling a trailer. The illustrated tractor includes a chassis or frame 30 and a cab 38 supported on the front portion of the frame 30. The frame 30 is supported on a set 32 of front wheels and tandem sets 34 and 36 of rear wheels. The rear portion of the frame 30 comprises (1) a pair of opposed longitudinally extending side plates 42 and 44 (FIG. 6) which support axles 46 and 48 for the tandem wheels 36 and 38, and (2) a longitudinally extending horizontal upper plate 50 (possibly composed of several interconnected plates) presenting an upper horizontal surface 52. A lower or tractor portion of the fifth wheel coupler 28 is mounted on the upper surface 52 of plate 50 and includes a pedestal 54 and a conventional bearing plate 56 pivotably mounted on the pedestal 54. As is conventional, a generally V shaped slot 58 is formed in the rear portion of the bearing plate 56 and terminates at a central socket 60. Propulsion of the tractor 24 is controlled by a transmission 40 mounted on the frame 30 under the cab 38.

Figure 2:
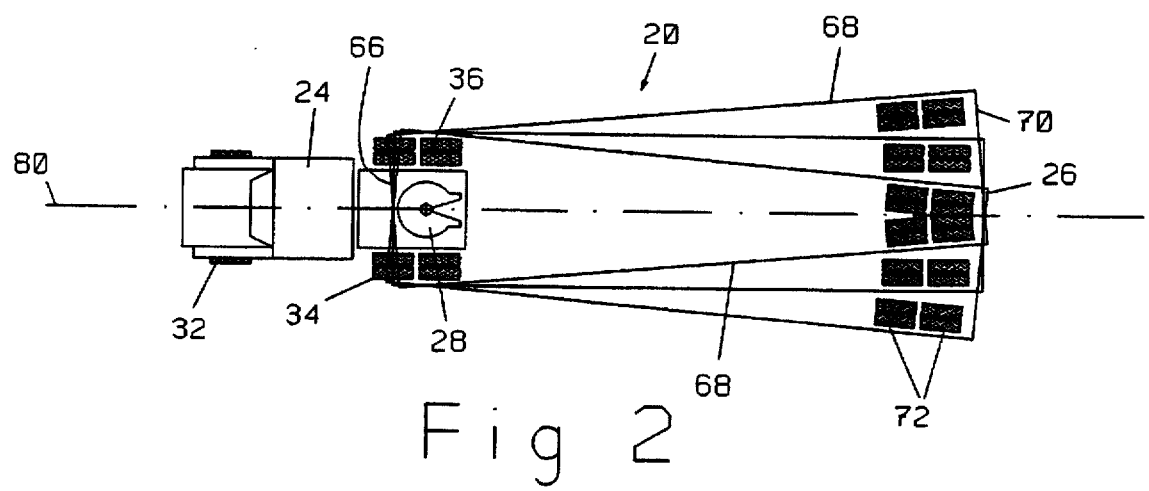
FIG. 2 is a schematic top plan view of the tractor trailer assembly of FIG. 1.
Figure 3:
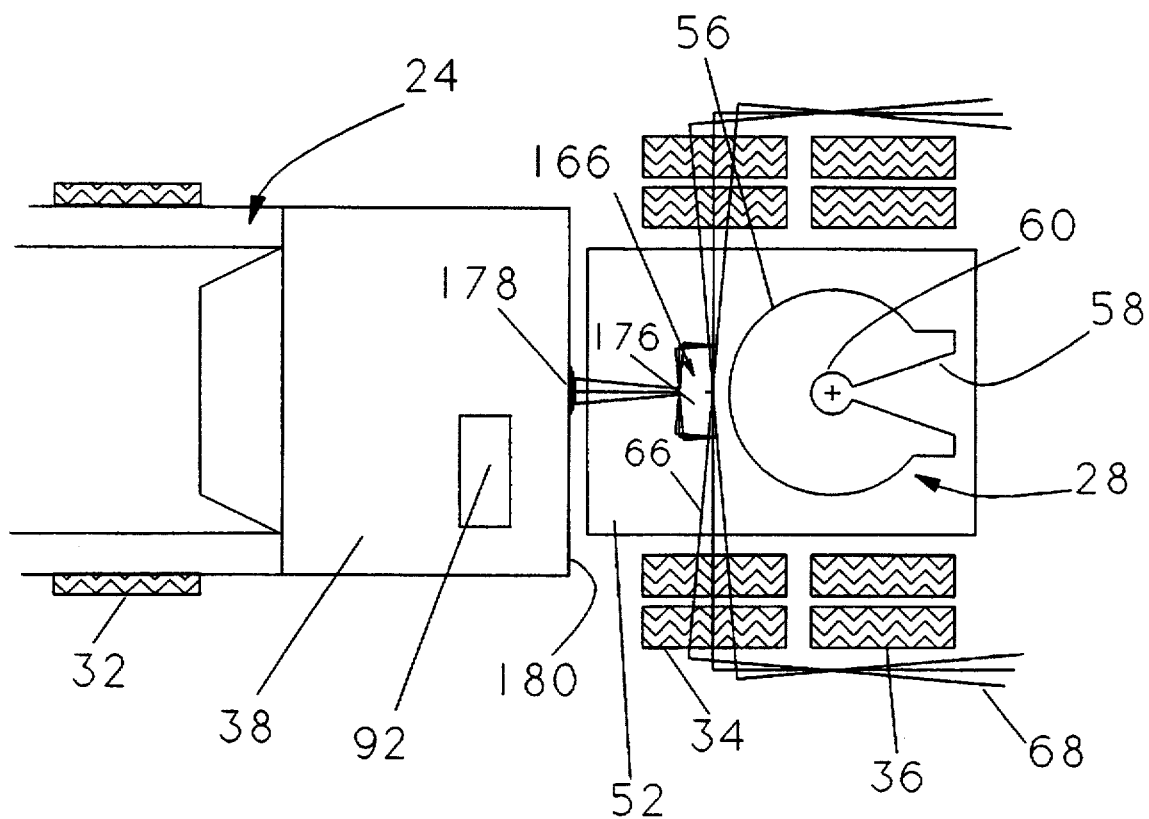
FIG. 3 is an enlarged fragmentary top plan view of the tractor trailer assembly of FIGS. 1 and 2.

The trailer 26 is also conventional and, referring to FIGS. 1-4 and 6, includes a lower underframe 62 on which is supported an upper shell composed of front, side, and rear walls 66, 68 and 70, respectively. The underframe 62 is supported on wheels 72 at its rear end and receives the upper or trailer portion of the fifth wheel coupler 28 at its front end. Specifically, an upper plate 74 is mounted on a front central portion of a lower surface of the underframe 62, and a king pin 78 is attached to a central portion of the upper plate 74, extends downwardly from the upper plate 74, and is received in the socket 60 of the bearing plate 56. The interaction between the king pin 78 and the socket 60 permits the trailer 26 to be pulled by the tractor 24 while being capable of swinging or pivoting about the line of tractor travel 80 as illustrated in FIGS. 2 and 3 to allow the tractor trailer assembly 20 to corner or traverse curves.

Of course, unintended and/or excessive swinging or pivotal movement of the trailer 26 relative to the tractor 24, known as jackknifing, should be avoided. The inventive jackknife control device 22 is designed to react to an incipient jackknife condition and to apply frictional forces to the trailer 26 which resist further trailer swinging before the jackknife condition becomes unmanageable. An incipient jackknife condition exists in the presence of either 1) excessive swinging movement of the rear end of the trailer 26 off the line of tractor travel 80, or 2) excessive overrunning inertia of the trailer 26 relative to the tractor 24. The inventive braking system 22 is designed to sense either of these conditions and to automatically resist additional trailer swinging in direct proportion to a determined degree of trailer jackknifing. Preferably, the inventive braking system 22 is designed to permit manual adjustment of the system, to permit manual activation of the brakes, and to permit manual resetting of the system under all operating conditions and to require manual resetting under certain operating conditions.

3. Construction of Jackknife Control Device

Referring now to the drawings and initially to FIGS. 1-9, the braking system 22 forming the inventive jackknife control device includes (1) a plurality (three in the illustrated embodiment) of brakes 82, 84, 86, (2) a proportional control brake actuator assembly 88, 90, and (3) a computer 92 which selectively controls the brake actuator assembly 88, 90 to selectively and automatically cause the brakes 82, 84, 86 to apply resistive forces to trailer swinging in direct proportion to a determined degree of trailer jackknifing. The illustrated brakes 82, 84, 86 are spaced in front of the fifth wheel coupler 28 and on opposed lateral sides of the fifth wheel coupler 28. Different numbers of brakes could be provided in different locations, if desired. Each of the brakes 82, 84, 86 is identical in construction and operation. Accordingly, only the brake 82 will be described, it being understood that the description applies equally to the brakes 84 and 86.

The brake 82 could comprise any structure capable of imposing a controllable, variable resistive force to swinging movement of the trailer 26 relative to the tractor 24. However, the brake 82 is preferably designed to engage directly the bottom surface of the trailer underframe 62 and thereby requiring minimal if any alterations to the existing fifth wheel coupler 28. The brake 82 is also designed to be compatible with existing tractor trailer designs and to be retrofitable onto an existing tractor trailer assembly. Towards these ends, the brake 82 is a pivot brake having a stationary mounting bracket 100, a cylinder 102, and a support rod 104.

Figure 4:
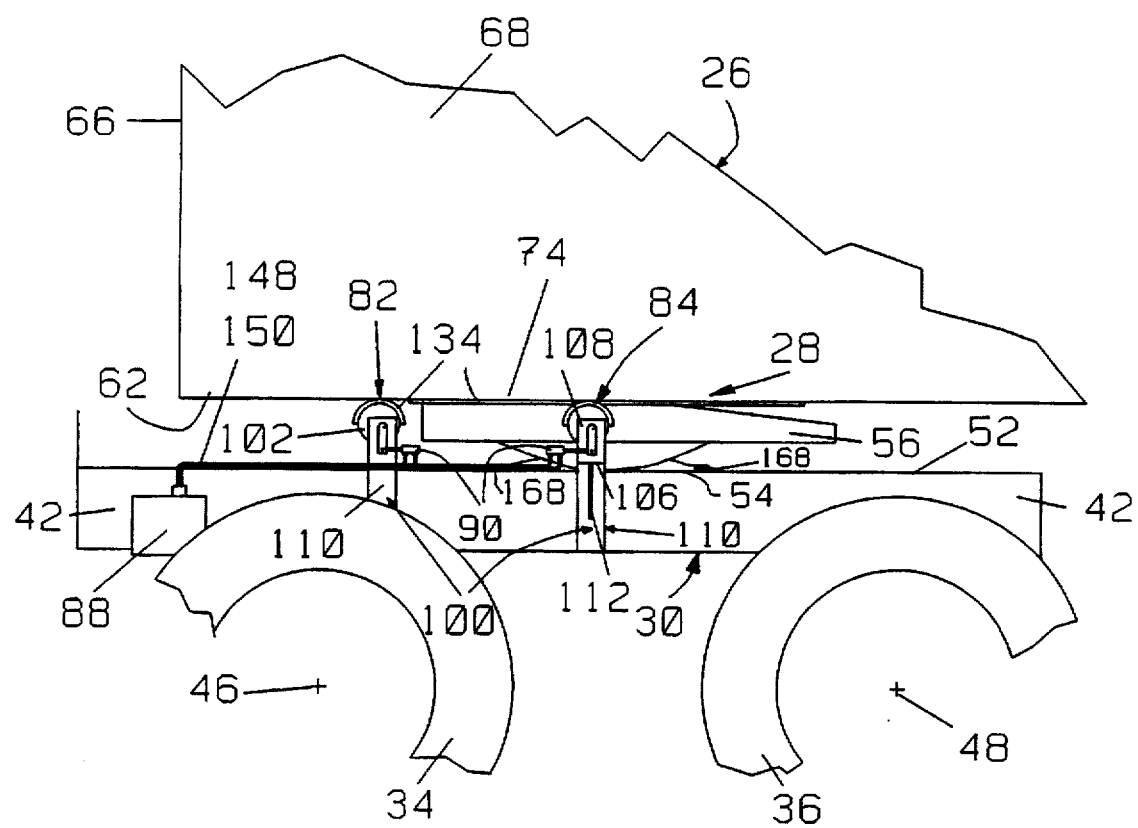
FIG. 4 is a fragmentary side elevation view of a portion of the tractor trailer assembly of FIGS. 1 and 2 and of the corresponding portions of the jackknife control device.
Figure 5:
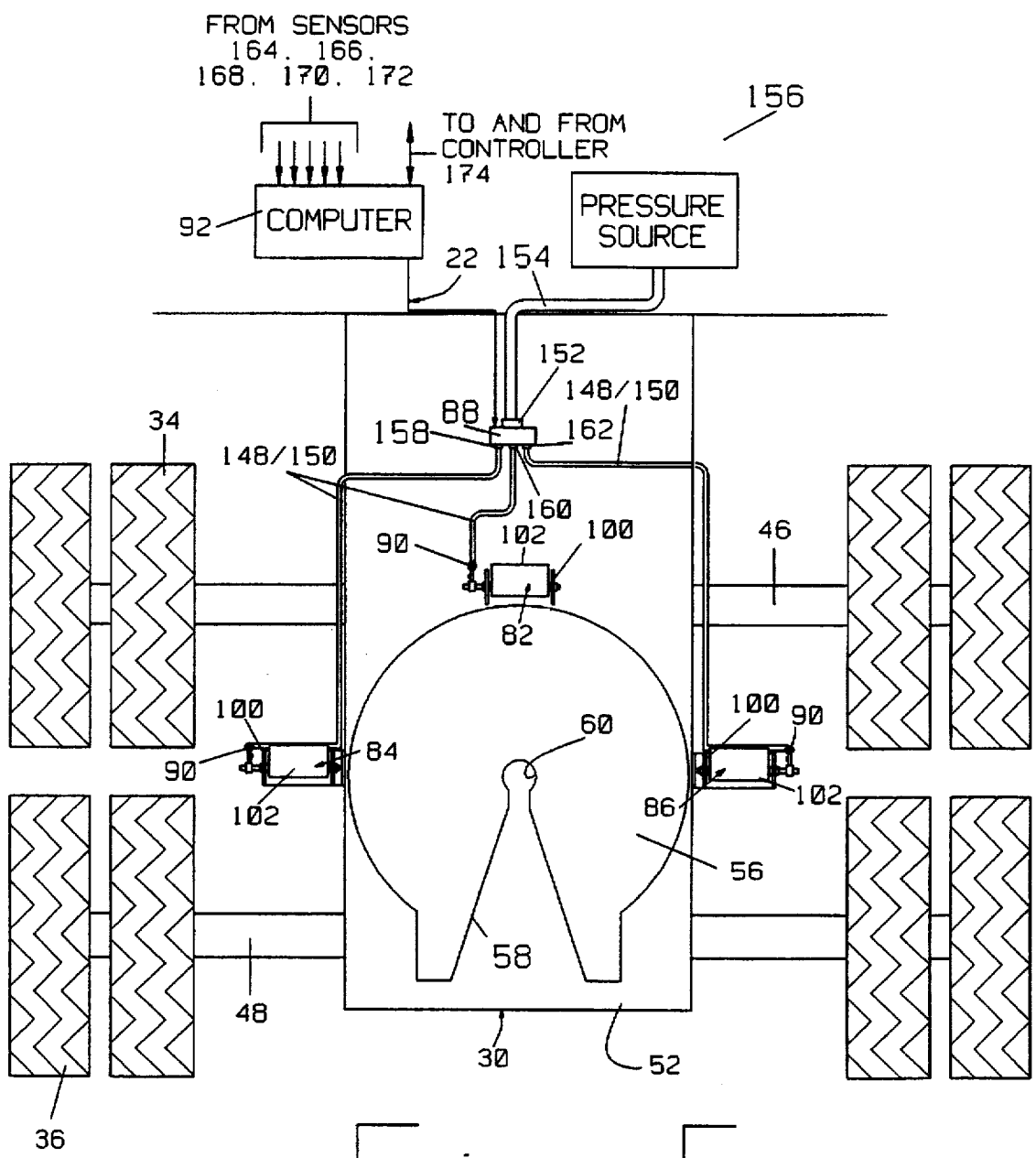
FIG. 5 is a partially schematic top plan view of a portion of the tractor and jackknife control device of FIGS. 1-4.
Figure 6:
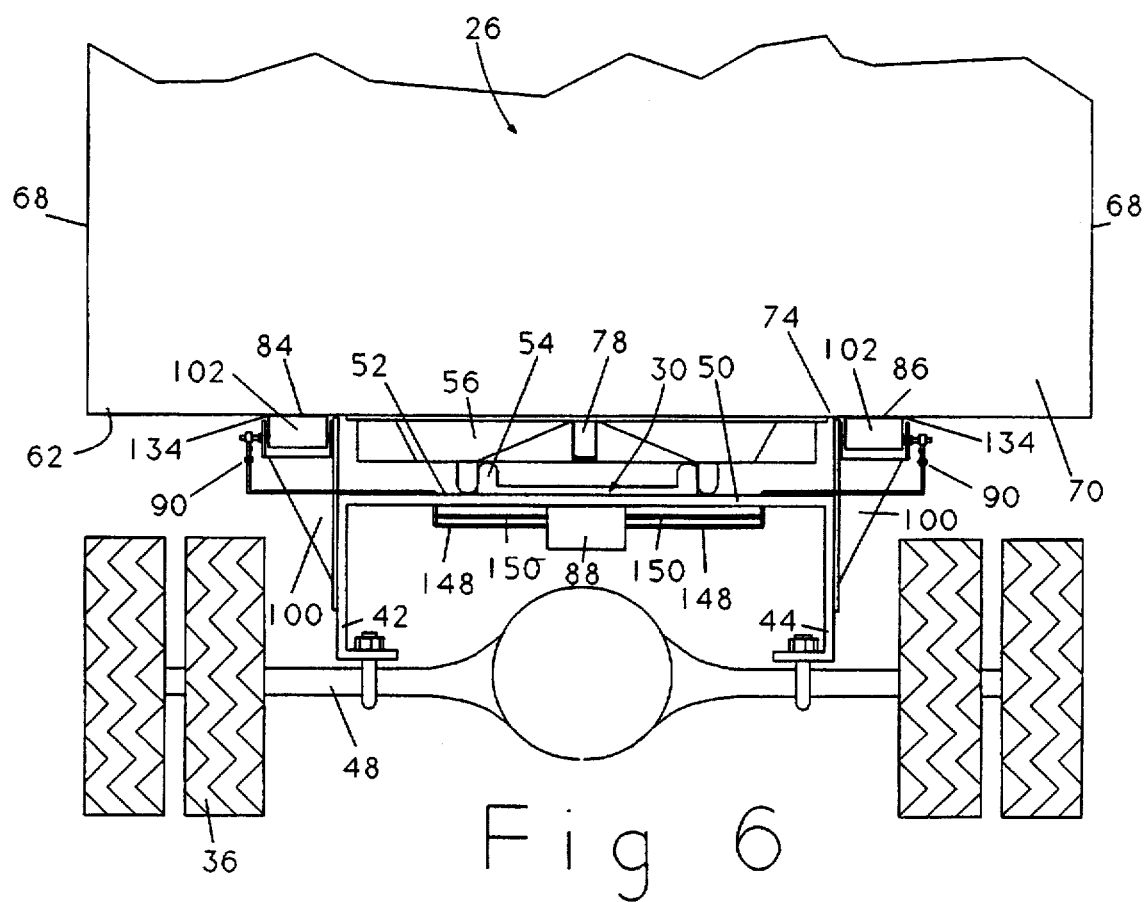
FIG. 6 is a fragmentary front end elevation view of the tractor trailer assembly and jackknife control device if FIGS. 1-5.

The mounting bracket 100 includes a horizontal base 106 and opposed front and rear end legs 108 and 110. Each of the legs 108, 110 extending a first portion extending above the base 106 and a second portion extending below the base 106 and attached to a suitable surface of the frame 30 as illustrated, e.g., in FIG. 6. A reinforcing plate 112 is disposed beneath the base 106 and is attached at opposed longitudinal ends to the legs 108 and 110 as illustrated in FIG. 4. A hole is formed in the upper end of each leg 108, 110 for receiving a bearing 118, 120 as illustrated in FIG. 8.

Figure 7:
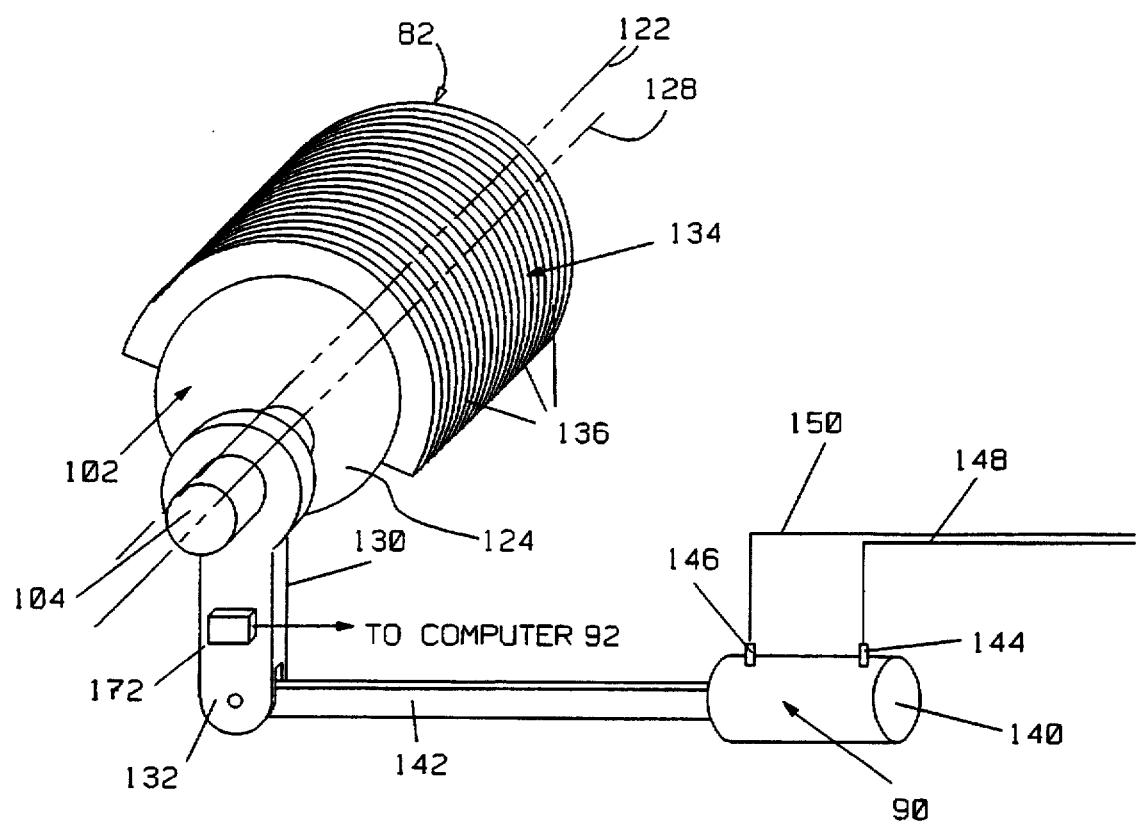
FIG. 7 is a perspective view of a brake and brake actuator assembly of the jackknife control device of FIGS. 1-6, the mounting bracket of the brake being removed for the sake of clarity.
Figure 8:
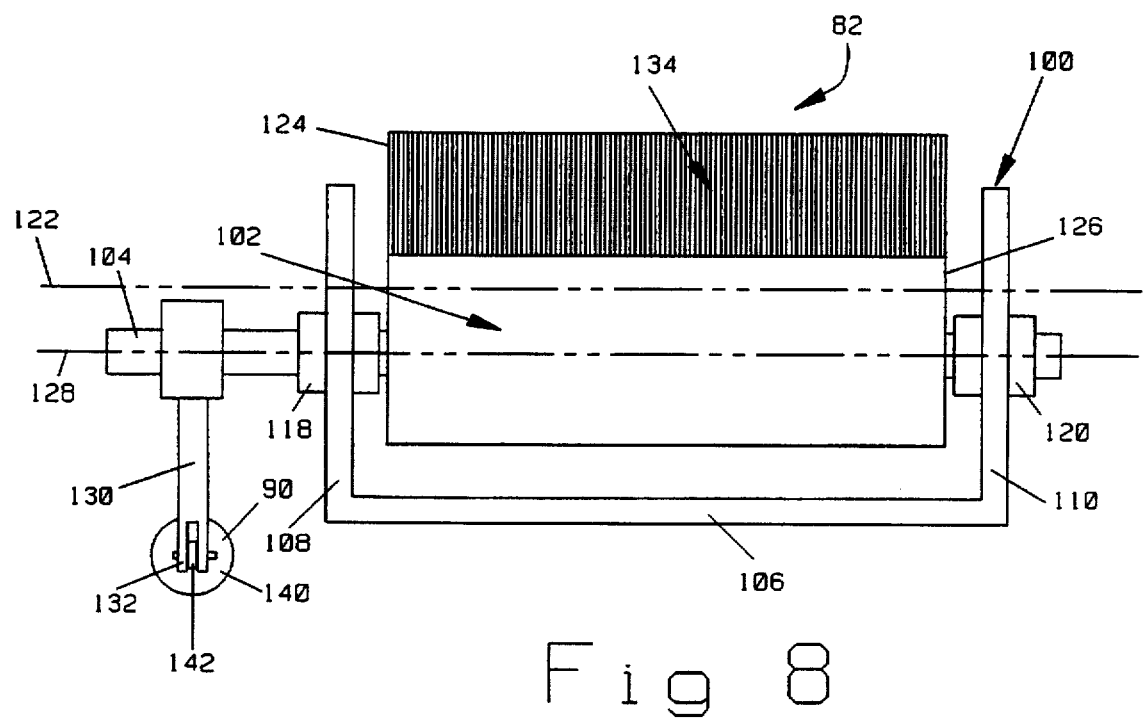
FIG. 8 is a side elevation view of the brake and brake actuator of FIG. 7.

Referring to FIGS. 7 and 8, the cylinder 102 is formed of a metal, preferably steel, and has a central longitudinal axis 122. A friction pad 134 is mounted on at least the upper surface of the cylinder 102 as detailed below. The support rod 104 extends axially through the cylinder 102, out of opposed axial ends 124, 126 of the cylinder, and is mounted in the bearings 118 and 120 so as to be rotatable about an axis 128 which is parallel with but offset from the central axis 122 of the cylinder 102. A crank 130 has a first end fixedly attached to the support rod 104 and a second end forming a clevis 132. Upon rotation of the support rod 104 under the action of the crank 130 as detailed below, the cylinder 102 acts as an eccentric brake cam to cause the friction pad 134 to engage the trailer underframe 62 with a force which increases progressively with cylinder rotation.

The friction pad 134 is bonded on the upper surface of the steel cylinder 102 for selective engagement with the bottom surface of the trailer underframe 62 upon the aforementioned eccentric rotation of the cylinder 102 about the mounting bracket 100. The pad 134, which is between about ½" and about 1" thick, preferably extends the complete axial length of the cylinder 102 and must extend around a sufficient circumference of the cylinder 102 to engage the bottom surface of trailer underframe 62 throughout the desired braking stroke. In the illustrated embodiment, the pad 134 extends around approximately 20–50%, preferably approximately 30–40%, of the periphery of the cylinder 102. The pad 134 also preferably has grooves, even more preferably semi-circular grooves 136, formed in its outer peripheral surface. The grooves 136 function to channel dirt, grease, and other debris which tends to accumulate on the bottom surface of the trailer underframe 62 away from the friction surface of the pad 134, thereby assuring direct or nearly direct contact between the braking surface of the pad 134 and the bottom surface of the trailer underframe 62 and thus assuring adequate braking.

The pad 134 may be formed from any suitable friction material capable of being formed in the required shape and of being bonded to the cylinder 102. The preferred pad is formed from the friction material "RF-41", available from Scan-Pack Manufacturing, Inc., Mequon, Wis. Other suitable oil-resistive braking materials could work equally as well.

The actuator assembly 88, 90 may comprise any structure which is responsive to the computer 92 to rotate the crank 130, the support rod 104, and the cylinder 102 a designated amount upon demand, thereby achieving the desired eccentric cam rotation and the resulting proportional braking. Although it is conceivable that a purely electrical system such as a stepper motor or a hydraulic system including a hydraulic proportional control valve and a hydraulic cylinder could be used, the preferred brake actuator assembly comprises a pneumatic system including a proportional pneumatic control valve 88 and a pneumatic drive cylinder 90.

The pneumatic drive cylinder 90 is a conventional double acting pneumatic cylinder and, referring to FIG. 7, includes a hollow cylinder 140 and a rod 142. The rod 142 extends axially from one end of the cylinder 140 and is connected at its remote end to the clevis 132 of the crank 130. First and second ports 144, 146 are formed in the cylinder 140 adjacent the rod and cylinder ends thereof and are connected to first and second pneumatic lines 148, 150, respectively. The lines 148, 150 are, in turn, coupled to corresponding ports of the pneumatic control valve 88. It should be noted at this point that the illustrated crank 130 coupling the rod 142 to the brake 82 could if desired be replaced by a slack linkage or any other suitable linkage.

A separate pneumatic proportional control valve could be employed for each brake. However, in the illustrated embodiment, a single valve 88 is employed for all three brakes 82, 84, 86. The valve 88 (FIG. 5) has (1) a single inlet port 152 connected by a pneumatic line 154 to a conventional pneumatic pressure source 156, preferably the same source which supplies pressure to the assembly's air brakes, and (2) a pair of outlet ports (only one 158, 160, 162 of which is illustrated) coupled to the lines 148, 150 of each cylinder 90. The valve 88 could be any conventional or off-the-shelf pneumatic control valve capable of causing the rods 142 of the drive cylinders 90 to traverse a designated stroke upon demand ranging from 0–100% of the maximum stroke. Since the valve 88 is conventional, it will not be described in further detail.

The computer 92, which may be mounted in a suitable location on the tractor 24, preferably comprises a conventional programmable computer having a RAM, ROM, BUS, etc. The computer 92 could, however, comprise a ladder-logic or PLC controller or even a microchip. Computer 92 (1) receives signals from various sensors providing signals indicative of prevailing tractor trailer assembly operating conditions as well as a feedback signal indicative of the brake position and (2) transmits an output signal to the valve 88 to cause proportional braking in response to a sensed incipient or actual trailer jackknife condition. Sensors transmitting signals to the computer 92 include a velocity sensor 164, a trailer inclination sensor 166, a sensor 168 providing an indication of an amount (if any) of overrunning inertia imposed on the tractor 24 by the trailer 26, a panic braking or panic stop sensor 170, and a feedback sensor 172. The computer 92 is also electronically coupled to a manual control module or manual controller 174. Each of the sensors and the manual controller will now be discussed in detail.

The velocity sensor 164 may comprise any sensor capable of detecting the forward velocity of the tractor 24. In the preferred and illustrated embodiment, the velocity sensor is a conventional transmission mounted velocity sensor mounted on the transmission 40 as illustrated schematically in FIG. 1. The transmission sensor serving as the velocity sensor 164 or another suitable transmission sensor also provides an indication of whether or not the transmission 40 is in reverse.

Referring to FIG. 3, trailer inclination sensor 166 comprises a (1) conventional IR optical sensor including an infrared generator 176 mounted on the front wall 66 of the trailer 26 and (2) a collimated collector 178 mounted on a rear wall 180 of the tractor cab 38. The generator 176 and collector 178 are aligned and shaped such that, when the trailer 26 is parallel with the tractor 24 as illustrated in solid lines in FIGS. 2 and 3, substantially all light generated by the generator 176 is detected by the collector 178. As the inclination of the collector 178 relative to the generator 176 changes during trailer swinging as illustrated in phantom lines in FIGS. 2 and 3, the amount of generated light detected by the collector 176 decreases proportionally with the increase in trailer inclination. As is conventional, the sensor 166 generates and transmits to the computer 92 a signal which varies proportionally with the amount of light detected by the collector 176.

The overrunning inertia sensor 168 may comprise any sensor or sensors capable of detecting directly or indirectly an amount of overrunning inertia imposed on the tractor 24 by the trailer 26. In the preferred and illustrated embodiment, the sensor 168 comprises at least one or possibly two or more strain gauges mounted on the fifth wheel coupler 28 as illustrated in FIGS. 1 and 4 and producing a signal indicative of the pressure imposed on the fifth wheel coupler 28 by the king pin 78.

The panic stop sensor 170 (FIG. 1) may comprise any suitable sensor which is mounted on the tractor 24 and which senses a relatively high deceleration indicative of a panic braking condition. Panic stop sensor 170 preferably comprises a deceleration sensor of the type commonly used to initiate operation of automobile air bags, but reacting to a lower deceleration than those sensed in air bag control systems.

The feedback sensor 172 is designed to provide an indication of the present brake operating condition so as to permit the brakes 82, 84, or 86 to be driven into the desired position using a simple feedback loop. The preferred sensor is a simple stroke sensor mounted on the crank 130 as illustrated in FIG. 7 and detecting the position of the rod 142 of the drive cylinder 90 relative to the cylinder 140.

Figure 9:
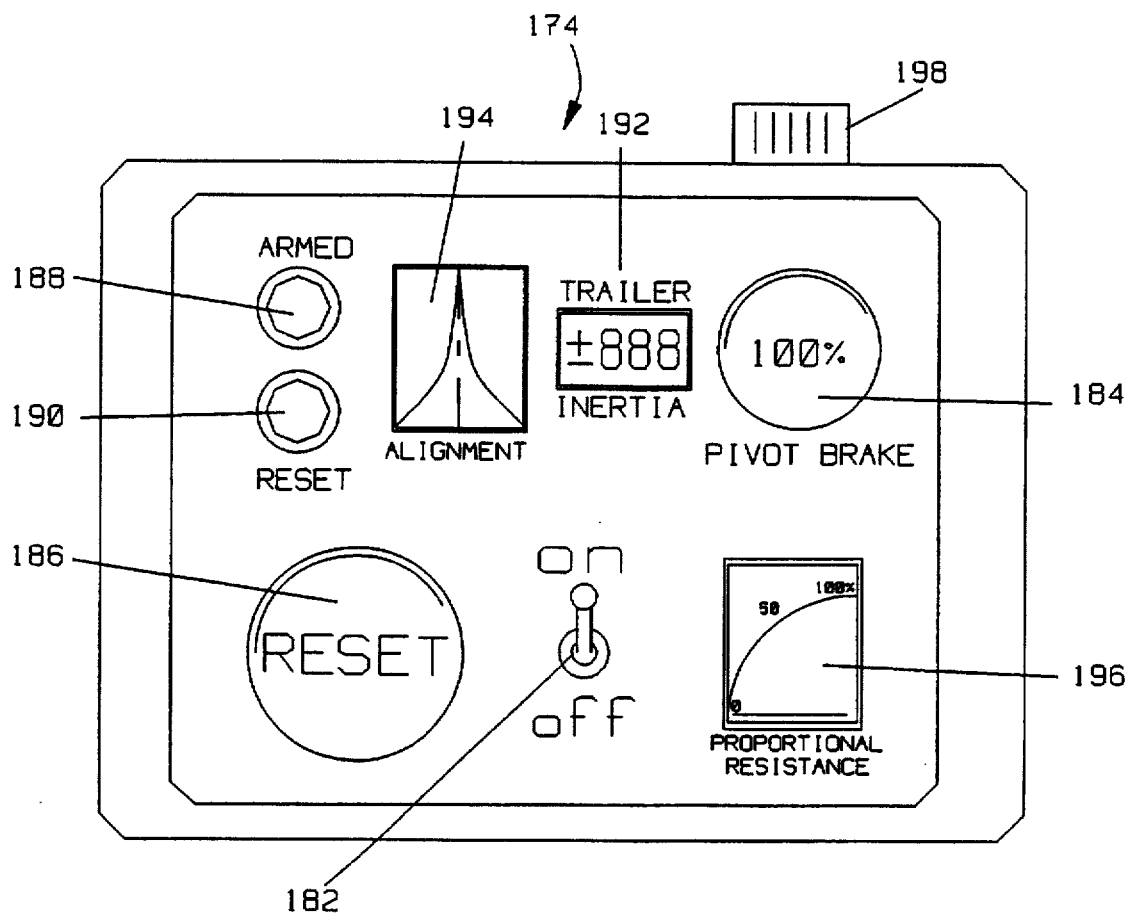
FIG. 9 is a front plan view of a control module of the jackknife control device illustrated in FIGS. 1-6.

The manual control module or manual controller 174 is designed to permit the driver to (1) observe the operational state of the braking system 22 and of the orientation of the trailer 26 relative to the tractor 24, (2) to arm or disarm the braking system 22, (3) to reset the braking system 22 and, (4) to adjust the control characteristics of the braking system 22. Referring especially to FIG. 9, the manual controller 174 includes (1) an on/off toggle switch 182 which arms or disarms the system 22, (2) a button 184 which, when depressed, causes full application of the brakes 82, 84, 86 irrespective of current trailer operation conditions, (3) and a reset button 186 which, when depressed, resets the brakes to an inoperative, standby condition. An "arm" indicator light 188 is included to provide a visual indication that the system 22 is armed, and a "reset" indicator light 190 is provided to provide a visual indication that the system needs to be reset. First, second and third gauges 192, 194 and 196 are also provided to indicate trailer overrunning inertia or force imposed on the tractor 24, the degree of trailer misalignment with respect to tractor 24, and the proportional resistance imposed by the brakes 82, 84, 86, respectively. An adjuster dial 198 permits manual threshold adjustment as detailed below.

4. Operation of Jackknife Control Device

Figure 12:
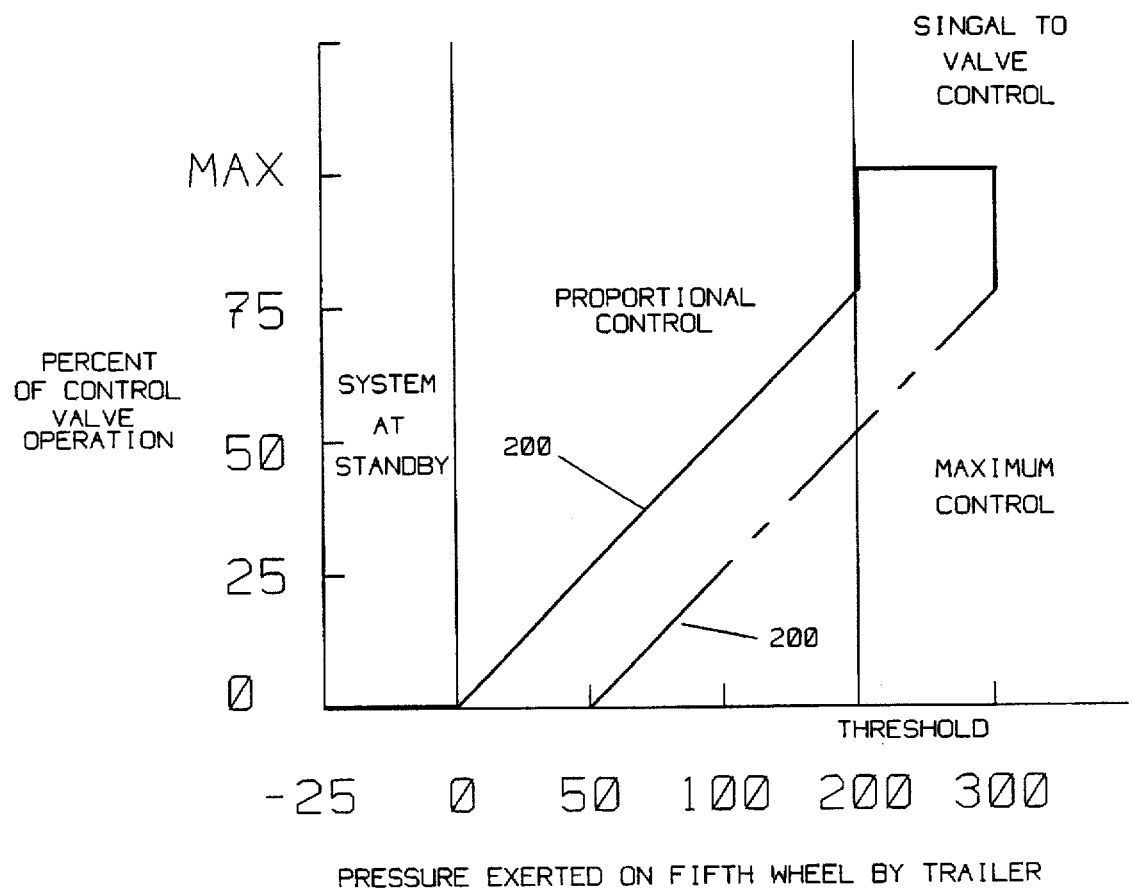
FIGS. 12 and 13 are graphs of proportional control signals generated 1) as a function of pressure exerted on the fifth wheel and 2) as a function of miles per hour verses angle of trailer off axis, respectively.
Figure 13:
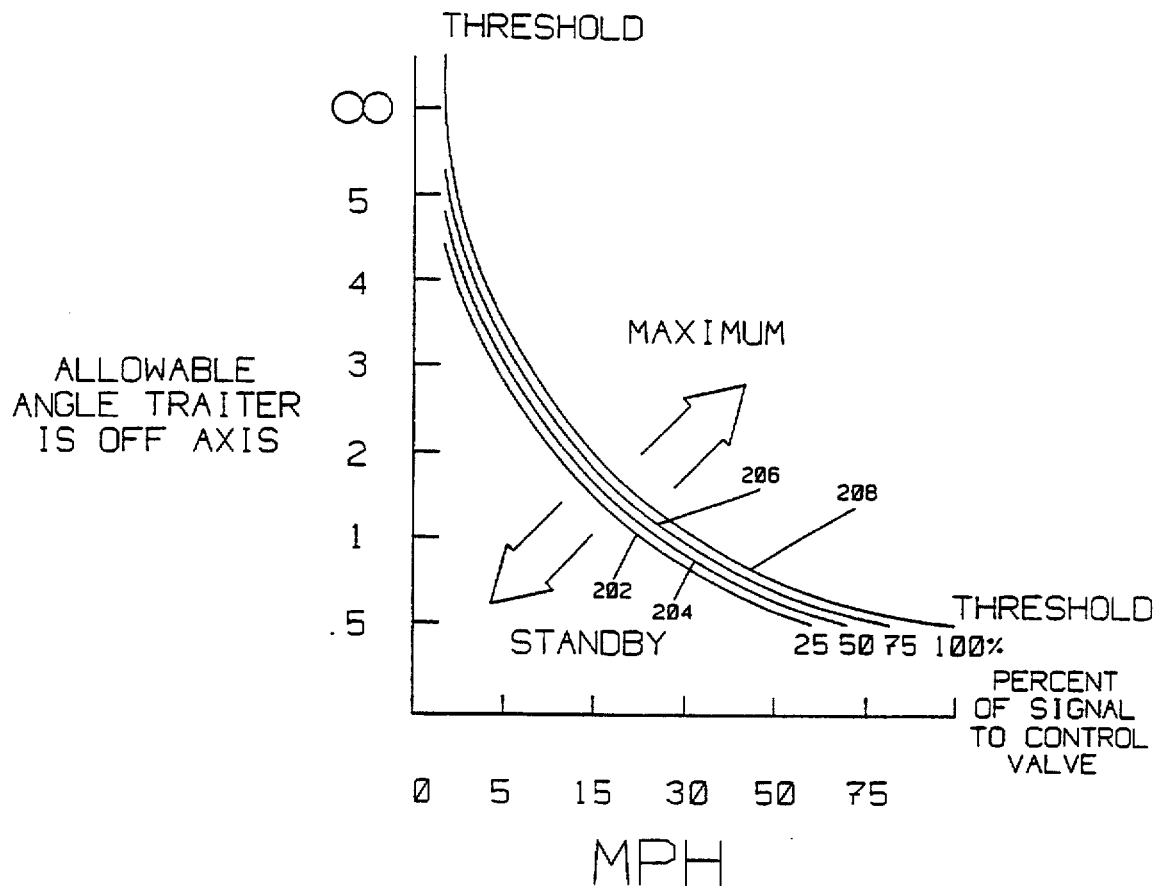

Since incipient or actual trailer jackknifing is evidenced by both 1) trailer inclination relative to vehicle speed, and 2) trailer overrunning inertia, the computer 92 is preprogrammed to respond to either of these parameters to apply proportional braking to the bottom surface of the trailer underframe 62. Thus, referring to FIG. 12 which illustrates a curve 200 graphically representing a map stored in the computer 92, the computer 92 reacts to the signals from the strain gauges 168 to cause the brakes 82, 84, 86 to be applied in direct proportion with the pressure exerted on the fifth wheel by the trailer 26. Specifically, the computer 92 causes the percent of valve control and thus the percent of maximum braking to increase progressively from 0 to 75% as pressure exerted on the fifth wheel coupler 28 increases from 0 to 200 psi, and thereafter to automatically increase braking to the maximum braking level and to maintain braking at this maximum level. Similarly, as illustrated graphically by the curves 202, 204, 206, and 208 in FIG. 13, a map is stored in the computer 92 which correlates the percent of valve control with vehicle speed and trailer inclination. As the curves in FIG. 13 illustrate, the amount of allowable trailer inclination, understandably, varies inversely with vehicle speed.

The adjuster dial 198 permits the driver to adjust the response characteristics of the braking system 22 to accommodate variations in loads and/or driving conditions. Thus, referring to FIG. 12, suitable manipulation of the dial 198 causes the computer 92 to switch over from the curve 200 illustrated in solid lines to the curve 200' illustrated in phantom lines. Similarly, in FIG. 13, suitable manipulation of dial 198 can, in effect, cause the computer 92 to shift the curves 202, 204, 206, and 208 in the direction of the arrows in FIG. 13.

Referring now to FIGS. 10A, 10B, 11A, and 11B, operation of the braking system 22 is controlled by a series of concurrently operating sub-routines programmed into the computer 92. All of the subroutines are initiated only when the braking system 22 is armed by actuation of the toggle switch 182 as shown by box 210. At this time, the braking system 22 is at standby as represented by large block 212, and no pressure is applied to the drive cylinders 90. The cylinders 90 therefore remain fully retracted, and the brakes 82, 84, 86 remain disengaged from the bottom surface of the trailer underframe 62 to permit uninhibited swinging of the trailer 26 relative to the tractor 24.

A routine 214 in FIG. 10A first determines in block 216 whether or not the driver has depressed the button 184 (FIG. 9) to manually command a trailer braking action. If not, the routine 214 returns to start. If so, the computer 92 causes the proportional control valve 88 to automatically apply the maximum pressure to the drive cylinders 90 and to apply all brakes fully as illustrated in blocks 218 and 220. The braking system 22 will maintain maximum air pressure to all cylinders 90 to retain all brakes 82, 84, 86 in a fully applied position unless and until it is determined in block 222 that the driver has depressed the reset button 186 (FIG. 9), at which time the cylinders 90 are depressurized and the brake cams reset as indicated by blocks 224 and 226. The routine 214 then returns to block 216.

Figure 10B:
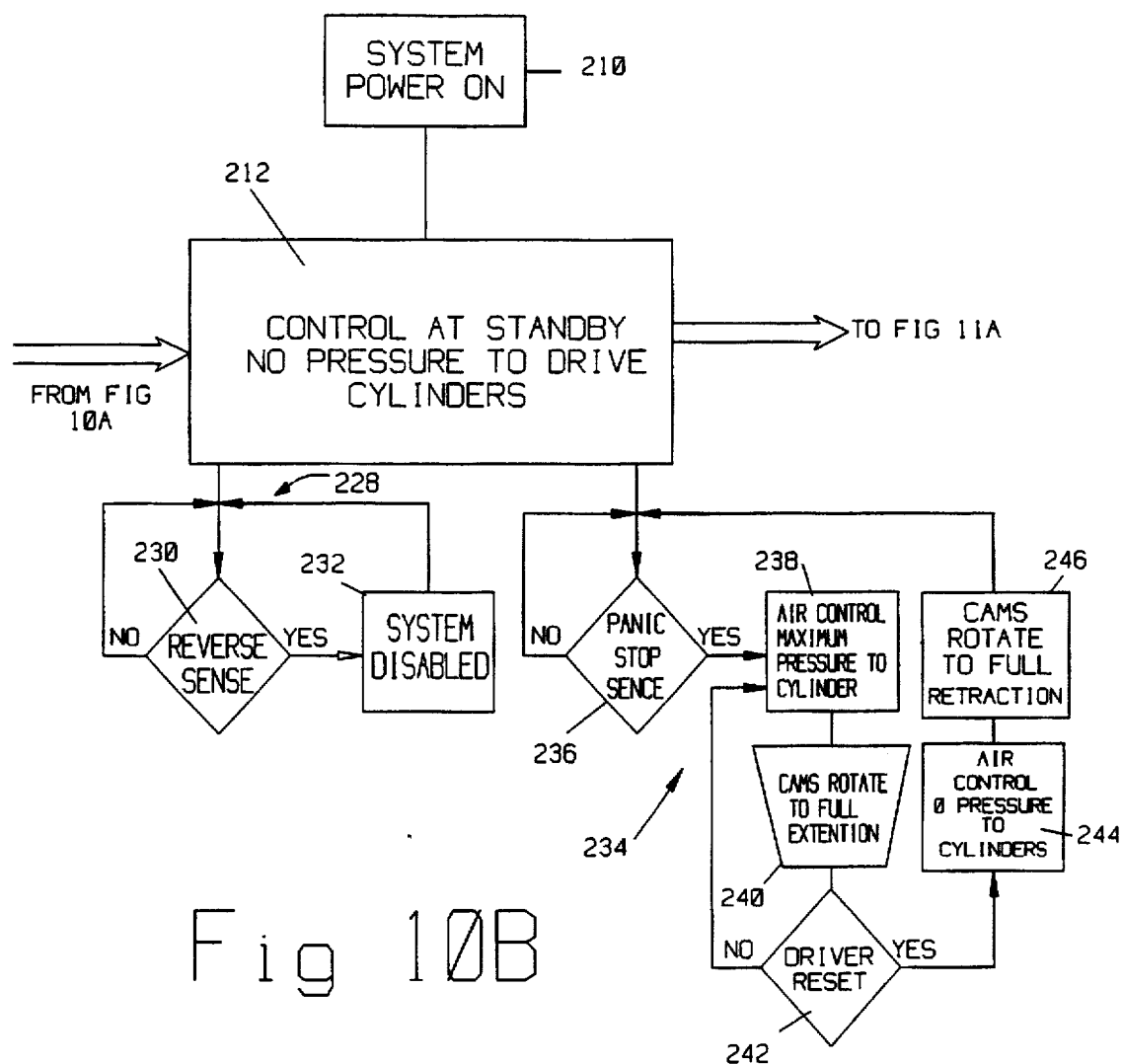

Routine 228, illustrated in FIG. 10B, is a very simple one, overridable only by the manually initiated routine 214. It inquires in block 230 whether or not the tractor 24 is in reverse, (using signals from sensor 164) and if so, disables the braking system 22 in block 232 unless and until the tractor 24 is no longer in reverse.

Routine 234, also illustrated in FIG. 10B, determines whether or not a panic braking or stop condition exists and reacts accordingly. Specifically, the routine 234 inquires in block 236 whether or not a panic stop or panic braking situation as detected by sensor 170 exists and, if it does, causes the valve 88 to supply maximum pressure to the cylinders 90 and thus to apply the brakes 82, 84, 86 fully as illustrated in blocks 238 and 240. The routine 234 then inquires in block 242 whether or not the driver has pushed the reset button 186, and, if so, returns air pressure in the drive cylinders 90 to zero and fully retracts the brake cams to a non-braking condition or standby mode as illustrated in blocks 244 and 246. Otherwise, the routine 234 returns to blocks 238 and 240 to maintain maximum air pressure in the cylinders 90.

Figure 11A:
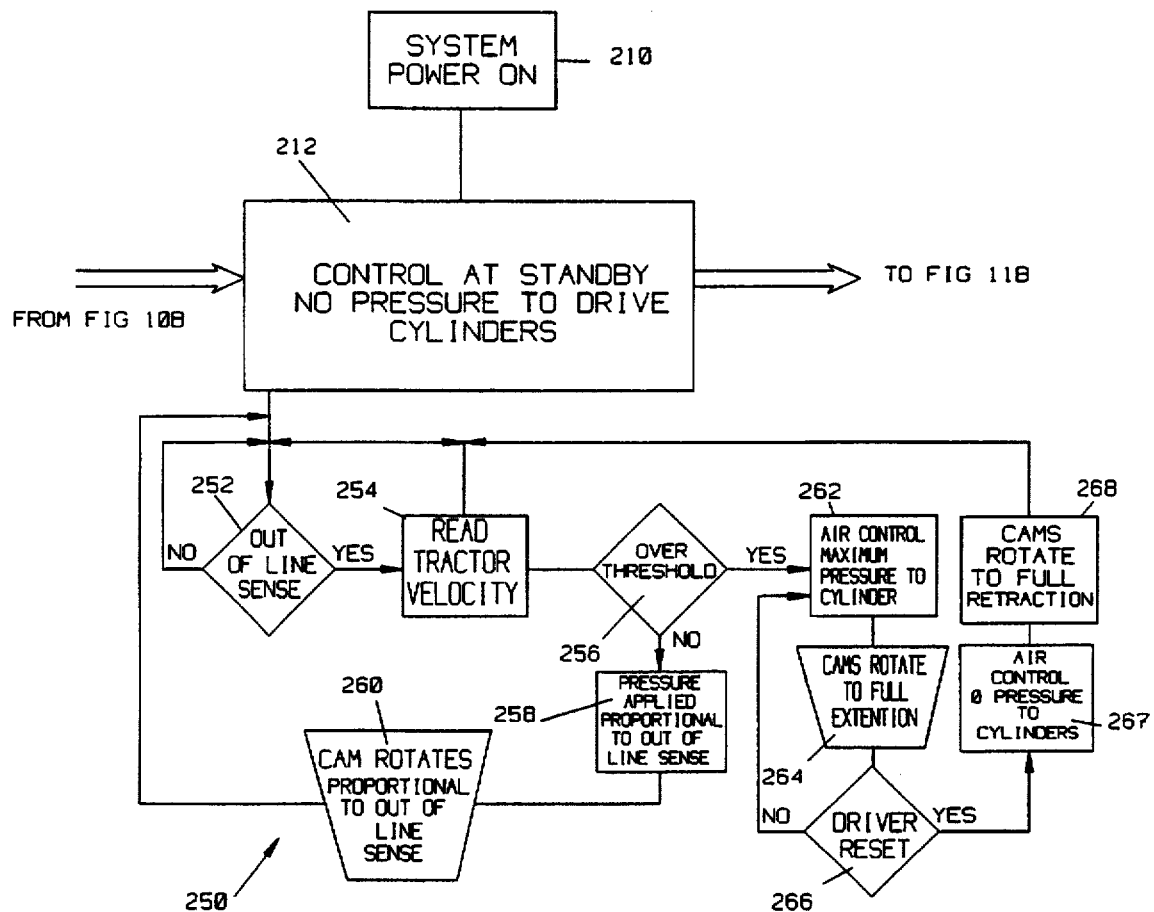

Referring now to FIG. 11A, the system's reaction to an incipient jackknife condition as represented by excessive trailer inclination is illustrated by routine 250. The routine 250 proceeds from standby (block 212) to block 252 where it determines if the trailer 26 is inclined relative to the tractor based upon signals received from the inclination sensor 166. If no inclination is sensed, the routine 250 returns to block 252. If any inclination is sensed, the tractor velocity is read in block 254 and the map, represented graphically by the curves 202, 204, 206, and 208 of FIG. 13, is called up to determine in block 256 whether or not the inclination is over a threshold at which maximum braking is required. If not, the valve 88 is controlled to supply proportional pressure to the cylinders 90 and thus to provide proportional braking in blocks 258 and 260, and the routine 250 then returns automatically to block 252. If, on the other hand, it is determined in inquiry block 256 that the sensed trailer inclination is over an acceptable threshold for the sensed vehicle speed, thus indicating an actual rather than incipient trailer jackknife condition, the computer 92 causes the valve 88 to apply maximum pressure to the cylinder 90 and thus to rotate the brake cams to the fully applied position as illustrated by blocks 262 and 264.

The braking system 22 will maintain maximum air pressure to all cylinders 90 to retain all brakes 82, 84, 86 in a fully applied position unless and until it is determined in block 266 that the driver has depressed the reset button 186, at which time the cylinders 90 are depressurized and the brake cams reset as indicated by blocks 267 and 268. The routine 250 then returns to block 252. This requirement for manual reset arises from the fact that full trailer braking is imposed only if the trailer 26 has moved beyond an incipient jackknife condition to a full-fledged jackknife position requiring driver attention. Requiring manual reset therefore alerts an inattentive driver to the problem and requires that he react to it before the braking system 22 can return to standby.

Figure 11B:
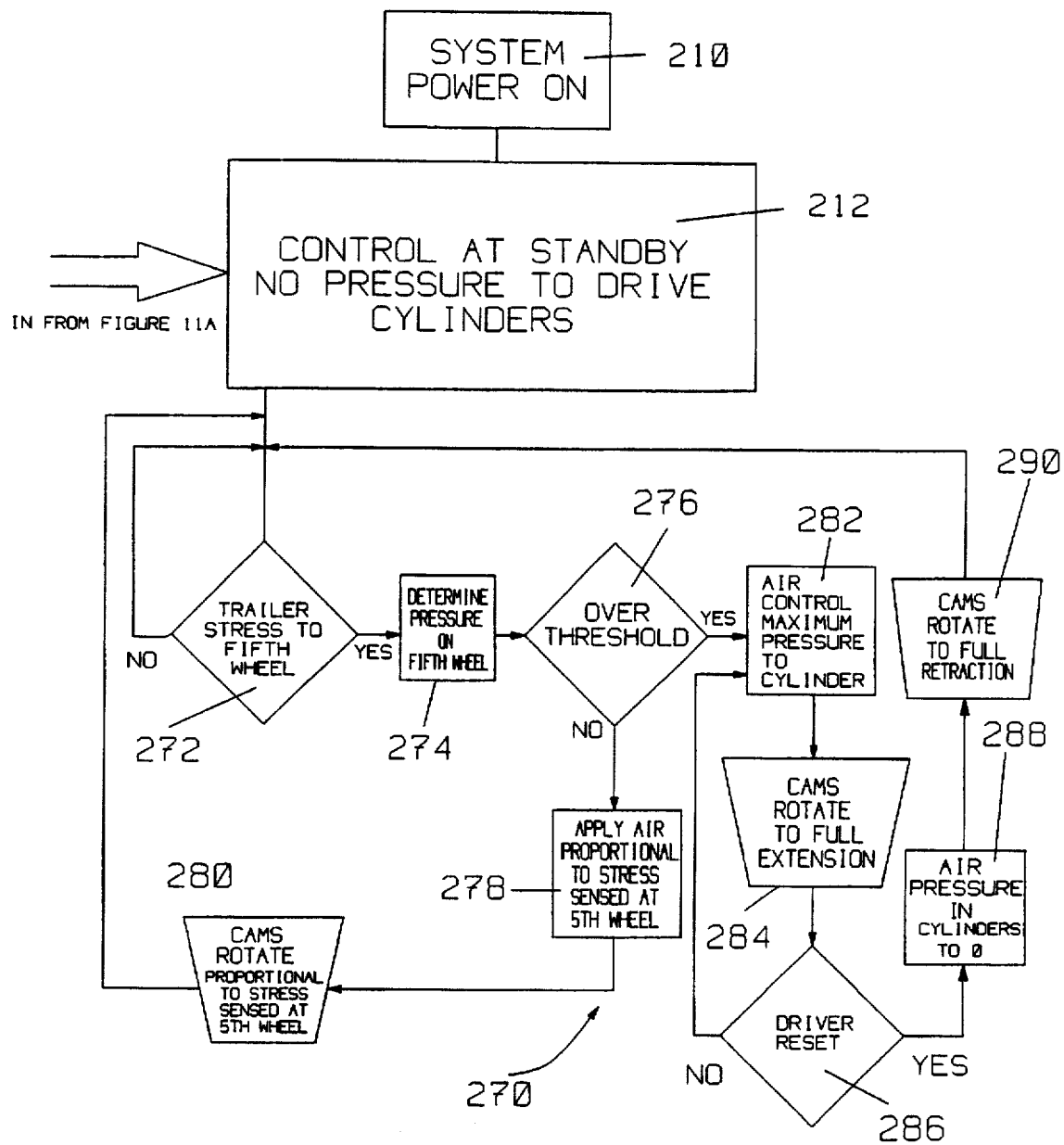

Referring to FIG. 11B, the routine 270 controls the braking system's reaction to trailer overrunning inertia relative to the tractor 24. The routine 270 proceeds from standby at block 212 to block 272 where it is determined, in response to signals received from strain gauge sensors 168, whether or not a discernable overrunning pressure is imposed on the tractor 24 by the trailer 26. If not, the routine 270 returns to start. If so, an inquiry is made in block 276, using the map represented by curve 200 of FIG. 12, as to whether or not the magnitude of the overrunning pressure is over a threshold indicative of a full-fledged jackknife as opposed to an incipient jackknife condition. If not, the computer 92 uses the map represented by the curve 200 in FIG. 12 to select a percent of control valve operation and a corresponding proportion of brake cam rotation suitable for the determined pressure as illustrated in blocks 278 and 280, and then returns to the inquiry block 272. If, on the other hand, the pressure on the fifth wheel coupler 28 is over the threshold (200 psi in the illustrated embodiment), indicating a full-fledged jackknife condition caused, e.g., a rear end collision or a side collision, the computer 92 automatically controls the valve 88 to supply maximum pressure to the cylinders 90 and thus to fully rotate the cams and to apply the brakes 82, 84, 86 fully as illustrated in blocks 282 and 284. As in the routine 250, the routine 270 maintains full pressure on the cylinders 90 and maintains the brakes 82, 84, 86 in a fully applied condition until it is determined in inquiry block 286 that the driver has depressed the button 186 to reset the braking system 22, at which point the pressure in the valve 88 is returned to 0 and the brake cams retracted as illustrated in blocks 288 and 290.

It can thus be seen that the inventive jackknife control device or braking system automatically applies frictional resistance to trailer swinging in the presence of either an incipient or a full-fledged jackknife condition. In the event of an incipient jackknife condition, the applied braking forces are proportional to the severity of the incipient jackknife condition. In the event of a full-fledged jackknife condition, maximum possible braking forces are applied and retained until the braking system 22 is manually reset. The resulting system is therefore more responsive than most previously proposed anti-jackknife systems because it goes into action before a full-fledged jackknife condition occurs and does not require driver intervention for actuation. By reacting early, the braking system 22 has the advantage of avoiding the need to control forces of unrealistically high magnitude. Moreover, because it does not interact directly with the fifth wheel coupler 28 and uses relatively simple but effective cam friction brakes 82, 84, 86, it is rather simple and inexpensive to fabricate and to install and can be easily incorporated into existing tractor trailer designs and even retro-fitted onto existing tractor trailers.

Of course, many changes and modifications could be made to the invention without departing from the spirit thereof. The scope of such changes will become apparent from the appended claims.

I claim:

1. A braking system for inhibiting a trailer of a tractor trailer assembly from jackknifing, said trailer comprising an underframe which has a front end portion supported on said tractor and a rear end portion supported on wheels, said braking system comprising:

(A) a source of pressurized fluid;

(B) a proportional control valve having an inlet port connected to said source of pressurized fluid and having an outlet port, said valve being controllable to selectively pressurize fluid in said outlet port to a variable level ranging from 0% of a maximum pressure level to 100% of said maximum pressure level;

(C) a fluid pressure cylinder fluidically coupled to said outlet of said valve;

(D) a friction brake which is mechanically coupled to said fluid pressure cylinder and which is located adjacent said underframe of said trailer;

(E) means for detecting an incipient trailer jackknife condition; and (F) means, coupled to said means for detecting and to said proportional control valve, for automatically controlling said proportional control valve to actuate said fluid pressure cylinder in response to a detected incipient jackknife condition to cause said brake to apply a resistive force to said underframe of said trailer that increases proportionally with a detected degree of trailer jackknifing.

2. A braking system as defined in claim 1, wherein said source of pressurized fluid comprises a source of pressurized air, said valve comprises a proportional control pneumatic valve, and said fluid pressure cylinder comprises a pneumatic cylinder.

3. A braking system as defined in claim 1, wherein said means for automatically controlling comprises a computer which transmits signals to said valve, and said means for detecting comprises a sensor assembly which is electronically coupled to said computer, which monitors a physical relationship between said trailer and said tractor, and which is capable of generating and transmitting to said computer a signal indicative of a degree of trailer jackknifing, and further comprising a feedback sensor which is electronically coupled to said computer and which is capable of generating and transmitting to said computer a signal indicative of a current operational state of said brake.

4. A braking system as defined in claim 3, wherein said sensor assembly comprises a tractor velocity sensor and at least one of 1) a sensor monitoring an angle of inclination of said trailer relative to said tractor, and 2) a sensor providing a signal indicative of an overrunning inertia of said trailer relative to said tractor.

5. A braking system as defined in claim 3, further comprising a manual controller which is electronically coupled to said computer, said manual controller including a reset switch which, when activated, causes said computer to reset said brake 1) from a braking condition 2) to a non-braking condition.

6. A braking system as defined in claim 1, wherein said brake includes a friction pad which moves non-linearly upon brake application.

7. A braking system as defined in claim 6, wherein said brake comprises an eccentric pivot brake the friction pad of which is pivotable about a pivot axis which is parallel with but offset from a central longitudinal rotational axis of said brake.

8. A braking system for inhibiting a trailer of a tractor trailer assembly from jackknifing, said system comprising:

(A) a source of pressurized fluid;

(B) a proportional control valve having an inlet port connected to said source of pressurized fluid and having an outlet port, said valve being controllable to selectively pressurize fluid in said outlet port to a variable level ranging from 0% of a maximum pressure level to 100% of said maximum pressure level;

(C) a fluid pressure cylinder fluidically coupled to said outlet of said valve; and (D) a friction brake which is mechanically coupled to said fluid pressure cylinder, said brake being dimensioned and configured to apply a resistive force to said trailer which increases proportionally to the fluid pressure in said outlet port of said valve, wherein said friction brake is a pivot brake which comprises (1) a stationary mounting bracket, (2) a cylinder having a friction pad mounted along at least a portion of an outer radial periphery thereof, and (3) a cylinder support which is 1) eccentrically mounted on an axial end of said cylinder, 2) rotatably mounted on said mounting bracket, and 3) mechanically coupled to said fluid pressure cylinder.

9. A braking system as defined in claim 8, wherein said friction pad has grooves formed in a braking surface thereof to channel debris away from said pad.

10. A braking system for inhibiting a trailer of a tractor trailer assembly from jackknifing, said system comprising:

(A) a source of pressurized fluid;

(B) a proportional control valve having an inlet port connected to said source of pressurized fluid and having an outlet port, said valve being controllable to selectively pressurize fluid in said outlet port to a variable level ranging from 0% of a maximum pressure level to 100% of said maximum pressure level;

(C) a fluid pressure cylinder fluidically coupled to said outlet of said valve; and (D) a friction brake which is mechanically coupled to said fluid pressure cylinder, said brake being dimensioned and configured to apply a resistive force to said trailer which increases proportionally to the fluid pressure in said outlet port of said valve, wherein said fluid pressure cylinder includes an axially movable rod, and wherein said brake is a pivot brake which comprises a stationary mounting bracket comprising a base and two opposed end legs extending upwardly from said base, each of said end legs having a hole formed therethrough, a metal cylinder having a central axis, opposed axial ends, and an outer radial periphery, a friction pad being mounted on at least a portion of said outer radial periphery of said cylinder, said friction pad extending along substantially an entire axial length of said cylinder and extending around at least 30% of the circumference of said cylinder, said friction pad having semi-circular grooves formed in an outer peripheral surface thereof, and a support rod which 1) extends eccentrically through said cylinder and out of said opposed axial ends thereof so as to be parallel with but offset from said central axis of said cylinder, 2) is rotatably journaled in said holes in said legs of said mounting bracket, and 3) is mechanically coupled to said fluid pressure cylinder by a crank having a first end attached to said support rod and a second end attached to said rod of said fluid pressure cylinder.

11. A vehicle comprising:

(A) a tractor including a cab and a trailer support frame presenting an upper horizontal surface;

(B) a trailer having a lower horizontal surface which extends along at least substantially an entire longitudinal length of said trailer;

(C) a fifth wheel coupler connecting said tailer to said tractor, said fifth wheel coupler including (1) a lower plate mounted on said upper surface of said support frame, said lower plate having a socket formed therein, (2) an upper plate mounted on said lower surface of said trailer, and (3) a king pin which is attached to said upper plate, which extends downwardly from said upper plate, and which is received in said socket in said lower plate; and (D) a braking system mounted on said tractor, said braking system including a brake which is mounted on said trailer support frame, said brake including a friction pad which is movable non-linearly with respect to said lower horizontal surface of said trailer from a first, inoperative position in which it is spaced from said lower horizontal surface of said trailer to a second, braking position in which it directly engages said lower horizontal surface of said trailer at a location away from said upper plate so as to resist trailer jackknifing.

12. A vehicle as defined in claim 11, wherein said brake is located in from of said upper plate, and wherein said braking system further comprises second and third brakes located adjacent opposite lateral sides of said upper plate.

13. A vehicle as defined in claim 11, wherein said actuator comprises a proportional control valve, and further comprising a computer which transmits signals to said valve, a sensor assembly which is electronically coupled to said computer, which monitors physical relationships between said trailer and said tractor, and which is capable of generating and transmitting to said computer a signal indicative of a degree of trailer jackknifing, and a feedback sensor which is electronically coupled to said computer and which is capable of generating and transmitting to said computer a signal indicative of a current operational state of said brake.

14. A vehicle as defined in claim 13, further comprising a manual controller which is mounted in said cab and which is electronically coupled to said computer, said manual controller including a reset switch which, when activated, causes said computer to reset said brake from a full-braking condition to a non-braking condition.

15. A vehicle comprising:

(A) a tractor including a cab and a trailer support frame presenting an upper horizontal surface;

(B) a trailer having a lower horizontal surface;

(C) a braking system mounted on said tractor, said braking system including a brake which is mounted on said trailer support frame, said brake including a friction pad which is movable from a first, inoperative position in which it is spaced from said lower horizontal surface of said trailer to a second, braking position in which it engages said lower horizontal surface of said trailer so as to resist trailer jackknifing, wherein said brake comprises an eccentric pivot brake the friction pad of which is pivotable about a pivot axis which is parallel with but offset from a central longitudinal axis of said brake; and (D) an actuator which selectively causes said brake to rotate about said pivot axis by an amount which is proportional to a calculated degree of trailer jackknifing.

16. A vehicle comprising:

(A) a tractor including a cab and a trailer support frame presenting an upper horizontal surface;

(B) a trailer having a lower horizontal surface;

(C) a braking system mounted on said tractor, said braking system including a brake which is mounted on said trailer support frame, said brake including a friction pad which is movable from a first, inoperative position in which it is spaced from said lower horizontal surface of said trailer to a second, braking position in which it engages said lower horizontal surface of said trailer so as to resist trailer jackknifing, wherein said brake comprises an eccentric pivot brake the friction pad of which is pivotable about a pivot axis which is parallel with but offset from a central longitudinal axis of said brake; and (D) an actuator which selectively causes said brake to rotate about said pivot axis by an amount which is proportional to a calculated degree of trailer jackknifing, and wherein said pivot brake comprises a stationary mounting bracket comprising a base and two opposed end legs extending upwardly from said base, each of said end legs having a hole formed therethrough, a metal cylinder having a central axis, opposed axial ends, and an outer radial periphery, a friction pad being mounted on at least a portion of said outer radial periphery of said cylinder, said friction pad extending along substantially an entire axial length of said cylinder and extending around at least 30% of the circumference of said cylinder, said friction pad having semi-circular grooves formed in an outer peripheral surface thereof to channel debris away from said pad, and a support rod which 1) extends eccentrically through said cylinder and said opposed axial ends thereof so as to be parallel with but offset from said central axis of said cylinder, 2) is rotatably journaled in said holes in said legs of said mounting bracket, and 3) is mechanically coupled to said fluid pressure cylinder by a crank having a first end attached to said support rod and a second end attached to a rod of said fluid pressure cylinder.

17. A braking system for inhibiting a trailer of a tractor trailer assembly from jackknifing, said system comprising:

(A) a source of pressurized fluid;

(B) a proportional control valve having an inlet port connected to said source of pressurized fluid and having an outlet port, said valve being controllable to selectively pressurize fluid in said outlet port to a variable level ranging from 0% of a maximum pressure level to 100% of said maximum pressure level;

(C) a fluid pressure cylinder fluidically coupled to said outlet of said valve;

(D) a friction brake which is mechanically coupled to said fluid pressure cylinder, said brake including a friction pad which moves non-linearly upon brake application to apply a resistive force to said trailer which increases proportionally to the fluid pressure in said outlet port of said valve.

18. A braking system as defined in claim 17, wherein said brake comprises an eccentric pivot brake the friction pad of which is pivotable about a pivot axis which is parallel with but offset from a central longitudinal rotational axis of said brake.

19. A braking system as defined in claim 17, wherein friction brake is a pivot brake which comprises a stationary mounting bracket, a cylinder having a friction pad mounted on at least a portion of an outer radial periphery thereof, and a cylinder support which is 1) eccentrically mounted on an axial end of said cylinder, 2) rotatably mounted on said mounting bracket, and 3) mechanically coupled to said fluid pressure cylinder.

* * * * *